United States Patent
Sjöblom

(10) Patent No.: US 8,464,655 B2
(45) Date of Patent: Jun. 18, 2013

(54) CLEANING WITHIN A MILKING SYSTEM

(75) Inventor: Krister Sjöblom, Ösmo (SE)

(73) Assignee: DeLaval Holding AB, Tumba (SE)

( * ) Notice: Subject to any disclaimer, the term of this patent is extended or adjusted under 35 U.S.C. 154(b) by 582 days.

(21) Appl. No.: 11/905,556

(22) Filed: Oct. 2, 2007

(65) Prior Publication Data

US 2008/0092822 A1   Apr. 24, 2008

(30) Foreign Application Priority Data

Oct. 18, 2006   (SE) ...................................... 0602185

(51) Int. Cl.
*A01J 3/00*   (2006.01)

(52) U.S. Cl.
USPC .................... 119/14.14; 119/14.02; 119/14.08

(58) Field of Classification Search
USPC .......... 119/14.08, 14.01, 14.02, 14.47, 14.03, 119/14.14
See application file for complete search history.

(56) References Cited

U.S. PATENT DOCUMENTS

| | | | |
|---|---|---|---|
| 5,069,160 A * | 12/1991 | Street et al. ................. | 119/14.08 |
| 5,784,994 A | 7/1998 | Van der Lely | |
| 6,267,077 B1 | 7/2001 | Van den Berg et al. | |
| 2004/0103846 A1 * | 6/2004 | Fransen ...................... | 119/14.03 |
| 2004/0182325 A1 * | 9/2004 | Sjolund et al. ............. | 119/14.02 |
| 2005/0076841 A1 * | 4/2005 | Van Den Berg et al. ... | 119/14.11 |
| 2005/0223998 A1 | 10/2005 | Bosma et al. | |
| 2008/0022933 A1 * | 1/2008 | Wase et al. ................. | 119/14.08 |

FOREIGN PATENT DOCUMENTS

| | | |
|---|---|---|
| EP | 0 551 960 | 7/1993 |
| EP | 1046336 | 10/2000 |
| EP | 1230844 | 8/2002 |
| EP | 1481583 A2 * | 1/2004 |
| EP | 1481583 | 12/2004 |
| WO | WO 00/72665 | 12/2000 |
| WO | WO 03/077645 | 9/2003 |
| WO | WO 03/077645 A1 * | 9/2003 |
| WO | WO 2005/122753 | 12/2005 |
| WO | WO 2005/122753 A1 * | 12/2005 |

OTHER PUBLICATIONS

European Search Report dated Feb. 25, 2011 issued in corresponding European Application No. 07 44 5034.

* cited by examiner

*Primary Examiner* — Andrea Valenti
(74) *Attorney, Agent, or Firm* — Young & Thompson

(57) ABSTRACT

Methods clean a gripping device (5) of a milking station (1) for milking animals. Methods include initiating (21) a gripper device cleaning procedure, moving (22) the gripper device (5) to a cleaning position, and carrying out (23) the gripper device cleaning procedure. Efficient and automatic cleaning of gripper devices is provided. Milking systems also include apparatuses for cleaning a gripper device.

11 Claims, 2 Drawing Sheets

CLEANING WITHIN A MILKING SYSTEM

PRIORITY STATEMENT

This application claims benefit of priority under 35 U.S.C. §119 from Swedish Patent Application No. 0602185-1 filed on Oct. 18, 2006, in the Swedish Patent Office, the disclosure of which is incorporated herein by reference in its entirety.

FIELD OF THE INVENTION

The present invention relates to the field of animal arrangements and in particular to a method for cleaning a gripper device of a milking station, and to a milking system for effectuating the cleaning method.

BACKGROUND OF THE INVENTION

Apparatuses for automatically milking animals are well known and have a widespread use. The milking apparatuses comprise various mechanical movable parts for implementing the automation. For example, a milking robot comprises a robot arm for automatically gripping teat cups and for attaching them to the teats of a milking animal, such as a cow.

The environments in which the milking apparatuses are arranged, for example cowsheds, are often dirty and dusty. This imposes strains on the mechanical parts of the automatic milking systems in that their proper functioning may be detrimentally affected or even halted by dirt entering into openings in the housings of the mechanical parts. A stoppage within a milking farm is very undesired since it not only imposes costs for the farmer, but may also be harmful and painful for the milking animals.

Gripping devices of the type that encloses the teat cups in order to grip hold of them, for example claw like grippers, have several movable parts prone to wear. Further, the movable parts of such gripper devices comprise a housing and joints having a number of openings into which dirt and dust may penetrate and detrimentally affect their performance.

From the above it is clear that the stresses put on the mechanical parts of the milking system, for example by dirt, should be kept at a minimum in order to obtain a secure and reliable operation.

The mechanical parts are therefore advantageously cleansed regularly in order to function properly. A farmer then typically inspects the milking station manually and washes off each milking station separately if required. It is clear that such cleaning may be cumbersome and time-consuming considering the number of openings in the various mechanical parts of each milking station. It is most desirable that cleaning procedures within a milking farm are efficient and easy to perform.

SUMMARY OF THE INVENTION

In contrast to the above-described claw type of gripper devices electromagnetic gripper devices generally do not have as many movable parts or open spaces in which dust and the like may gather. An example of electromagnetic gripper devices is disclosed in the International Application WO 2005/122753, assigned to the same applicant as the present application.

The electromagnetic gripper devices in the above-mentioned document do not have any movable parts and are each made in one piece. Thereby the gripper devices lack openings into which dust and dirt may enter. All gripper devices manufactured may further be identical to each other, i.e. they need not be adapted for use at a particular side of the animals being milked.

Although the electromagnetic gripper devices described above have advantages compared to traditional gripping claws, they will still need to be cleansed. The gripper device has to be capable of gripping and holding teat cups firmly and also to withstand forces exerted on the teat cups while being moved in the usage. If the electromagnet of the gripper device is dirty its grip on the teat cup will inevitably be poorer.

It is therefore an object of the invention to provide cleaning means for cleaning gripper devices, and in particular for cleaning electromagnetic gripper devices.

It is another object of the present invention to provide means for enabling an efficient and reliable cleaning of gripper devices, which do not require cumbersome and time-consuming cleaning steps.

It is yet another object of the present invention to provide means for enabling a cost-efficient and simple cleaning of gripper devices.

In accordance with the invention, a method for cleaning a gripping device of a milking station for milking animals is provided. The method comprises the steps of initiating a gripper device cleaning procedure; moving the gripper device to a cleaning position; and carrying out the gripper device cleaning procedure. Further, the invention is easily implemented in already existing and utilized milking stations, with only minor changes. The present invention thus provides a cost-efficient way to perform the cleaning, since existing cleaning steps may be utilized.

In an embodiment of the invention, the gripping device is arranged on or is a part of a robot arm. This embodiment of the invention provides a cost-efficient way to perform the cleaning, wherein the movement ability of the robot arm holding a gripper device can be utilised. That is, an existing robot arm is able to perform movements in order to fetch teat cups, and a similar movement may be utilised for cleaning the gripper device arranged on the robot arm. Further, the gripper device may be arranged on any handling device for handling teat cups and the like, which handling device is manually moved or computer-controlled.

In accordance with an embodiment of the invention, the step of initiating the gripper device cleaning procedure is performed when a milking occasion is completed or at regular intervals or when a failure to grip the teat cup is detected. The initiation can be performed at any suitable triggering occurrence or event and a flexible cleaning of the gripper device is thereby provided. The cleaning can be customized to suit the particular user and the particular milking plant.

In accordance with another embodiment of the invention, the method further comprises the step of moving the gripper device back to an idle position upon completion of the gripper device cleaning procedure. If the gripper device is arranged on a robot arm, then the robot arm is moved to an idle position upon completion of the cleaning process. The robot arm and/or gripper device is thereby always ready for a subsequent operation and the efficiency of a milking system is increased.

In accordance with still another embodiment of the invention, the method comprises the further step of determining a degree of soil on a surface of the gripper device. If it is determined that the gripper device is too soiled to function properly, the cleaning procedure may be initiated. A most reliable functioning of the gripper device can thereby be obtained, wherein the gripper device always provides a firm grip of the teat cup or the like.

In accordance with yet another embodiment of the invention, the step of carrying out the gripper device cleaning procedure comprises rubbing the gripper device against a sponge. In an alternative embodiment the gripper device cleaning procedure comprises spraying cleaning agent on the surface of the gripper device. In a further yet embodiment, the gripper device cleaning procedure comprises blowing air on the surface of the gripper device. The cleaning procedure can thereby be made very flexible to suit the needs of the specific user.

The invention also relates to a milking station comprising cleaning means for cleaning the gripper device, whereby advantages similar to the above are achieved.

Further characteristics of the invention and advantages thereof will be evident from the following detailed description of preferred embodiments of the present invention given hereinafter and the accompanying figures, which are given by way of illustration only, and shall thus not be construed as limitative of the present invention.

DETAILED DESCRIPTION OF EMBODIMENTS

Figure 1:
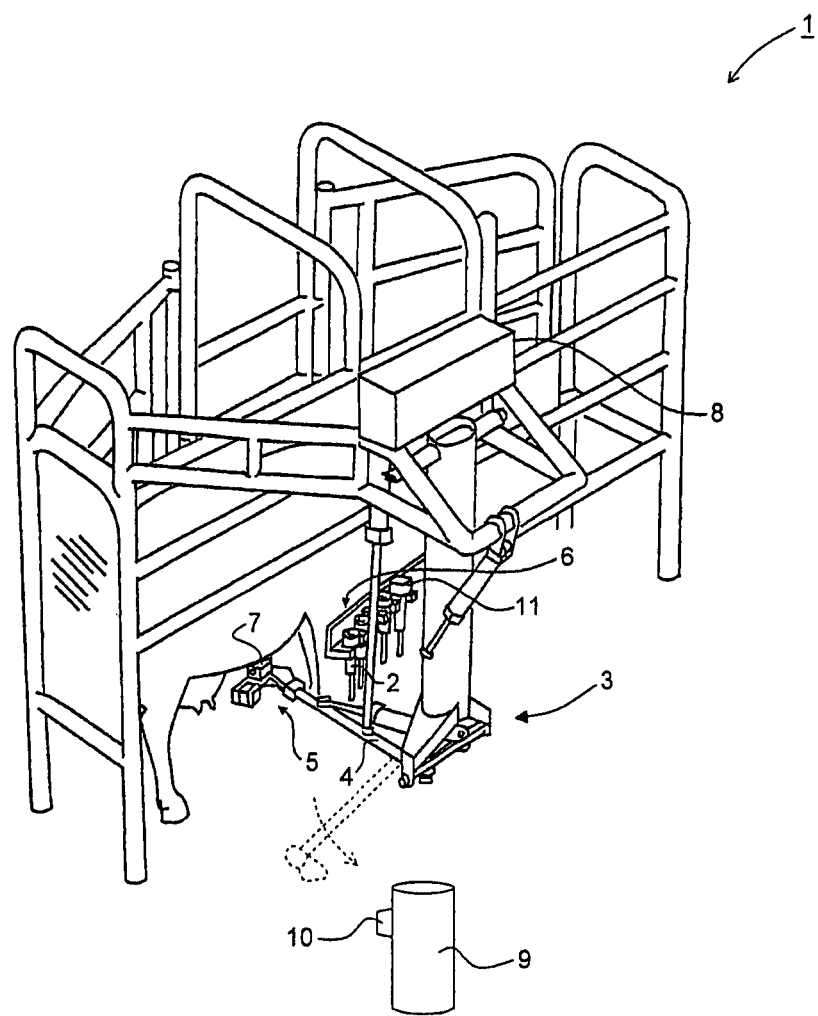
FIG. 1 illustrates a milking robot of a milking system comprising the cleaning means in accordance with the present invention.

A milking system or milking station 1 for voluntary milking comprising cleaning means in accordance with the invention is illustrated in FIG. 1. An automatic milking machine (not illustrated in detail) is provided for milking animals, such as for example cows. The automatic milking machine comprises teat cups 2 connected to an end unit by means of milk lines (only small portions of which attached to the teat cups are shown in the figure).

A milking robot or other automatic handling device 3 having a handling device, such as a robot arm 4, equipped with a gripper device 5 in its far end is provided for automatically fetching the teat cups 2 of the milking machine from a rack 6, in which the teat cups 2 are stored. The robot arm 4 moves the teat cups 2 toward the udder of the cow and attaches them to the teats of the cow. The teat cups 2 may be fetched, moved and attached one at a time or several at a time. The milking robot 3 is typically equipped with a camera system or other detecting device 7 for determining the exact positions of the teats to which the teat cups 2 are to be attached.

The gripper device 5 is intended to grip, to hold and to release the teat cups 2 or other equipment, such as for example a teat-cleaning cup 11.

The milking station 1 may comprise other conventionally used devices, not shown or described in detail herein. For example, teat-treatment devices may be provided, identification members for identifying a cow etc.

The milking station 1 further comprises a control unit 8, which is responsible for controlling the milking station 1. Processing within the control unit 8 comprise, inter alia, initiation of various activities in connection with the milking such as opening and closing of gates, controlling of the automatic milking machine and the milking robot 3. The control unit 8 typically comprise a microcomputer, suitable software and a database including information of each of the cows being milked by the automatic milking machine, such as for example when a specific cow was last milked or last fed, or her milk production, her health etc.

In accordance with the invention, means are provided for enabling efficient cleaning of the gripper device 5. In one embodiment of the invention, the means comprise a cleaning device 9 having a suitable cleaning member 10. The cleaning member 10 may for example comprise spray means for spraying cleaning agents on the gripper device 5, or blowing means for blowing air, preferably compressed air, onto the gripper device 5 and thereby cleaning it. Other types of cleaning members are conceivable as well.

In a particular embodiment the cleaning member 10 is a sponge or the like. The cleaning is then effectuated by removing dirt off the gripper device 5 by rubbing it against the sponge. The cleaning member 10 of the cleaning device 9 is then a suitable sponge. The use of a sponge provides a cost-efficient solution, with low energy consumption and low purchase costs. Further, the sponge is easily replaced when need arises.

The robot arm 4 comprising the gripper device 5 is moved towards the cleaning device 9 upon initiation of a gripper device cleaning procedure. The gripper device 5 of the robot arm 4 is thereby moved to a cleaning position (indicated by dashed lines in the figure) in which the cleaning can be performed. In case the cleaning member 10 is a sponge, the robot arm 4 is preferably arranged to move back and forth in front of the sponge a number of times in order to rub the gripper device 5 against it.

Upon finishing the cleaning of the gripper device 5, the robot arm 4 is returned to a non-active or an idle position. The robot arm 4 is then ready for a subsequent operation, such as fetching teat cups 2 or the like.

For ease of illustration, the cleaning device 9 is shown as a separate unit in the figure. However, the cleaning device 9 is preferably integrated with the milking station 1 in any suitable manner, for example constituting part of or being arranged on the enclosure of the milking station 1. The cleaning device may be arranged on a part of the milking robot 3. The only requirement is that the cleaning device 9 is placed so as to be within reach of the gripper device 5 of the robot arm 4.

The control unit 8 comprises software for effectuating the cleaning procedure in accordance with the invention. The cleaning procedure for cleaning the gripper device 5 may be programmed and customized to suit the needs of the specific farm in which it is utilized.

The cleaning may, for example, be performed after each cow that has been milked, after every fifth or tenth milked cow, a certain number of times an hour or whatever frequency is most appropriate for the particular milking farm. The frequency may depend on various factors, such as the number of cows (the environment may be more soiled the more cows are being kept), the water quality, the sensitivity of the gripper device and so on. The frequency with which to cleanse the gripper device 5 can be set by the user and is easily changed should such need arise. The suitable cleaning frequency is programmed into the control unit 8.

There are means for transmitting signals from the control unit 8 to the milking robot 3, for initiation of the gripper device cleaning procedure. That is, the control unit 8 comprises means, such as software, for initiating the gripper device cleaning procedure. However, the gripper device 5 may comprise means for transmitting signals to the control unit 8 as well. For example, the gripper device 5 may include sensing means for sensing if the surface of the gripper device 5 is too soiled to function properly and transmit an indication to the control unit 8 about this. Such sensing of a soiled surface may be implemented by means of a camera and a laser source emitting laser light. The detecting device 7 described earlier may be utilised in this sensing of a soiled surface. The camera is provided to register laser light as reflected from the gripper device 5 and to thereby enable a determination of whether the surface of the gripper device 5 is soiled. The gripper device 5 may comprise an optical sensor for this end, which optical sensor presumably is as soiled as the gripper device surface in which it is arranged. Alternatively, inductive sensors may be provided in the gripper device 5 for sensing a magnetic field or an inductance or a change thereof as caused by the gripper device surface being soiled.

A video camera or CCD-camera may be utilised for the above sensing of a soiled surface. Such camera may be fixedly arranged to take images of the gripper device 5 in the idle position, and the control unit 8 may then comprise means for processing the images or evaluating the need of cleansing in dependence on the amount of reflected light.

The cleaning may also be initiated if the gripper device 5 fails to grip hold of a teat cup. Sensing means for sensing such failure is then included within the gripper device 5. Such sensing means are disclosed in a patent application entitled "Detecting arrangement and method for a magnetic gripper device", filed on Sep. 2, 2005, assigned to the same applicant as the present application. The control unit 8 may be programmed to initiate the cleaning procedure of the gripper device 5 in case of such teat attachment failure.

Further, the sensing means may also detect if the performance of the gripper device 5 is deteriorating, that is, the gripper device 5 may still be capable of holding a teat cup 2 but the grip is deteriorating. The gripper device 5 is then cleaned before a failure occurs.

Typically, when a teat attachment step fails, the control unit 8 of the milking machine starts a fault-localizing test. Such fault-localizing tests require rather long periods of time in order to be performed, typically about 10-15 minutes, during which no milking can be done. In contrast, the cleaning step in accordance with the invention may be accomplished within about 5-10 s. Therefore, should the teat attachment procedure fail, cleaning of the gripper device 5 is a fast way to eliminate the possibility of the gripper device 5 being too dirty as the cause to the failure, or a fast way to obtain a successful teat attachment in case the reason for the failure is indeed that the gripper device 5 is too dirty.

The detecting device 7, for example a camera, for determining the exact positions of the teats may need cleaning as well. The detecting device 7 is preferably cleansed regularly in order to not reduce its performance. The cleaning of the detecting device 7 may, for example, be performed by moving the robot arm 4 comprising the detecting device 7 to a cleaning position. In an embodiment of the invention, the same cleaning device is utilised for cleaning the gripper device 5.

Since the cleaning of the gripper device 5 is performed in a similar manner or even by utilising the same cleaning means as is used for cleaning the detecting device 7, a most cost-efficient cleaning of gripper devices is provided.

In an embodiment of the invention, the cleaning of the gripper device 5 is performed each time cleaning of the detecting device 7 is effectuated. In particular, the cleaning device 9 may be adapted to accomplish simultaneous cleaning of the detecting device 7 and the gripper device 5. The cleaning device 9 may comprise different cleaning members for the gripper device 5 and the detecting device 7, respectively. The different cleaning members may then be arranged so as to allow simultaneous cleaning to be performed.

Figure 2:
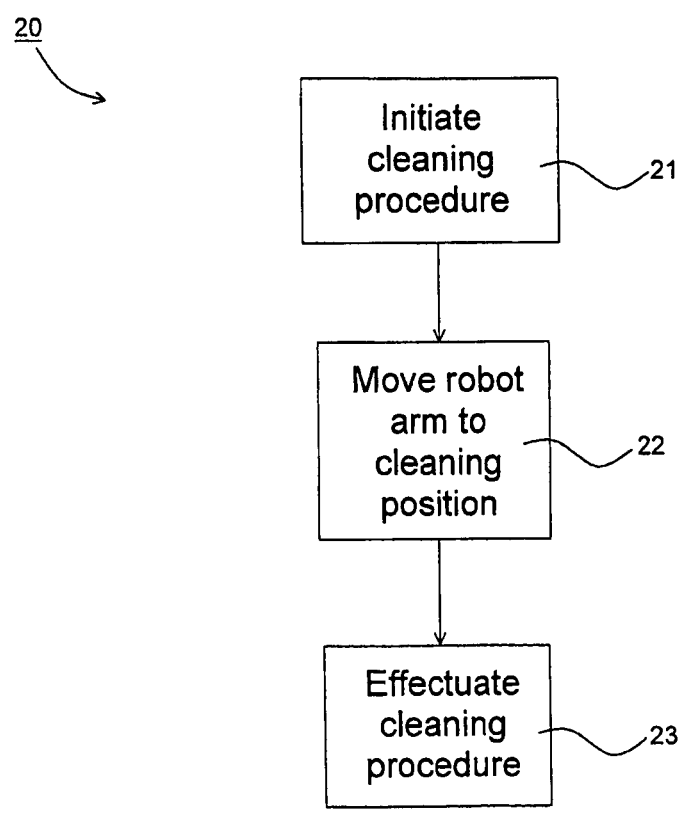
FIG. 2 illustrates the method for cleaning a gripper device in accordance with the present invention.

The invention is also related to a corresponding method, illustrated in FIG. 2. The method 20 for cleaning the gripping device 5 arranged on the robot arm 4 of the milking station 1 is initiated in step 21. The initiation may be triggered, for example, at completion of a milking occasion or at a detected failure to grip the teat cup 2 as described above. The initiation may be triggered by other means as well. In step 22 the robot arm 4 comprising the gripper device 5 is moved to a cleaning position. In the cleaning position, the robot arm 4 is in close proximity of the cleaning device 9 comprising the cleaning member 10. Finally, in step 23, the cleaning of the gripper device 5 is carried out. The gripper device cleaning procedure may comprise any suitable ways of cleaning the gripper device 5. For example, the gripper device cleaning procedure may comprise rubbing the gripper device 5 against a sponge, or spraying cleaning agents on the surface of the gripper device, or even a combination of the described different cleaning procedures. In the cleaning position, a detecting device 7 of the milking station 1 can also be cleaned. Such step of cleaning the detecting device 7 can be effectuated before or after the cleaning of the gripper device 5. Upon completion of the gripper device cleaning procedure, the robot arm 4 may be moved to an idle position, in which the robot arm 4 is ready for a subsequent operation, such as a teat attachment procedure.

The gripper device 5 is preferably an electromagnetic gripper device, but any other type of gripper device may benefit from the present invention. Since electromagnetic gripper devices do not have any movable parts or open spaces wherein dirt may gather, they are particularly suitable for being cleansed by means of the invention.

In the above description a milking station has been described in connection with an automatic milking system, and in particular a milking station for voluntary milking. However, the present invention may be utilised in other milking environments as well, for example in a not fully automated milking environment. For the purposes of the present invention, a milking station can be any area in which a milking animal is being milked, that is, an area arranged to house at least one animal for milking. The present invention can be implemented in any type of milking stall, for example a parallel stall arrangement or a rotary milking parlour. The term "milking station" is thus intended to encompass different types of milking stations.

Similarly, throughout the above description the term "robot arm" has been utilised. However, the term robot arm has been used in an illustrative embodiment of the invention, in which the term robot arm is generally used to denote a part of a milking robot. In the above description, the term "robot arm" could be exchanged to "handling device". The handling device is intended to denote a handling device for handling teat cups and other milking related equipment. In accordance with the invention, such handling device may be the described robot arm of a milking robot, but it may alternatively be a supporting arm or service arm that can be moved in a computer-controlled manner, semi-manually or manually to a cleaning position.

In summary, the present invention provides an efficient cleaning of gripper devices. The farmer is alleviated from the task of manually inspecting the gripper devices and wash them upon need. Further, by regularly cleaning the gripper device the operation of the milking station is ensured and the gripper device provides at all times a firm and reliable grip of the teat cups.

While the present invention has been described in various embodiments it shall be appreciated that the invention is not limited to the specific features and details set forth, but is defined only by the appended patent claims.

The invention claimed is:

1. A method for cleaning a teat cup gripper device of a milking station for milking animals, the milking station including a control unit, an automatic moving device, and a cleaning device, the method comprises:

automatically detecting when a gripping surface of the gripper device is too soiled to grip a teat cup properly by
i) detecting, with a sensor, performance deterioration of the gripper device as indicated by a degree of soil on the gripping surface, wherein the performance deterioration detected by the sensor relates to the ability of the gripper device to hold a teat cup, and
ii) based on the detected degree of soil, forming a determination when the gripping surface of the gripper device is too soiled to function properly to grip the teat cup; and
automatically initiating, based on the detected performance deterioration, and the determination that the gripper device is too soiled to function properly to grip the teat cup, with the control unit, a gripper device cleaning procedure including,
moving, with the automatic moving device, the gripper device to a cleaning position, and
cleaning, with the cleaning device, the gripper device to remove dirt off the gripping surface of the gripper device;
transmitting, with the sensor, information of the detected performance deterioration of the gripper device;
receiving, with the control unit, the information;
processing, with the control unit, the information to determine if cleaning is necessary, the cleaning procedure being initiated based on the processing,
wherein the gripper device is an electromagnetic gripper device,
wherein the sensor is an inductive sensor in the electromagnetic gripper device, the inductive sensor sensing a magnetic field, an inductance, or a change of inductance caused by the gripper device surface being soiled, and
wherein the transmitted information from the sensor is at least one of magnetic field information, induced electric current information, and a change field or current information, said transmitted information used for forming the determination that the gripper device is too soiled to function properly to grip the teat cup.

2. The method as claimed in claim 1, wherein the detecting and initiating based thereon are performed upon completion of a milking occasion, or at regular intervals.

3. The method as claimed in claim 1, further comprising:
moving said gripper device to an idle position after the gripper device cleaning procedure.

4. The method as claimed in claim 1, wherein the cleaning includes at least one of rubbing said gripper device against a sponge and blowing air on a surface of the gripper device.

5. The method as claimed in claim 1, wherein the cleaning procedure further includes cleaning a detecting device of the milking station.

6. The method as claimed in claim 1, wherein the detecting, initiating, moving, and cleaning are performed without operator action.

7. The method of claim 1, wherein the cleaning includes spraying cleaning agent on a surface of the gripper device.

8. A milking system comprising:
a gripper device configured to grip teat cups;
a cleaning device configured to clean the gripper device;
an automatic moving device configured to automatically move the gripper device to the cleaning device;
a sensor configured to detect performance deterioration of the gripper device; and
a control unit configured to control the cleaning device and the automatic moving device and initiate a cleaning procedure with the cleaning device and the automatic moving device, the initiating based on the detected performance deterioration,
wherein the sensor and control unit are operatively connected to automatically detect when a gripping surface of the gripper device is too soiled to grip the teat cups properly by
i) the sensor determining performance deterioration of the gripper device as indicated by a degree of soil on the gripping surface, wherein the performance deterioration detected by the sensor relates to the ability of the gripper device to hold a teat cup, and
ii) based on the detected degree of soil, forming a determination when the gripping surface of the gripper device is too soiled to function properly to grip the teat cup, and
wherein, based on the detected performance deterioration and the determination that the gripper device is too soiled to function properly to grip the teat cup, to automatically initiate the gripper device cleaning procedure,
wherein the gripper device is an electromagnetic gripper device, and
wherein the sensor is an inductive sensor in the electromagnetic gripper device, the inductive sensor sensing a magnetic field, an inductance, or a change of inductance caused by the gripper device surface being soiled and providing an information thereof to the control unit for forming the determination that the gripper device is too soiled to function properly to grip the teat cup.

9. The milking system as claimed in claim 8,
wherein the automatic moving device includes a robot arm,
wherein the gripper device is part of the robot arm,
wherein the control unit is a part of the automatic moving device, and
wherein the control unit is configured to control movements of the robot arm.

10. The milking system as claimed in claim 8, wherein the cleaning device includes at least one of a cleaning member in the form of a sponge, and a cleaning member configured to blow air onto the gripper device.

11. The system of claim 8, wherein the cleaning device includes at least one of a cleaning member configured to spray cleaning agent on a surface of the gripper device.

* * * * *